(No Model.)
J. T. LONG.
APPARATUS FOR SEPARATING GOLD AND SILVER FROM GRAVEL AND SAND.
No. 267,697. Patented Nov. 21, 1882.
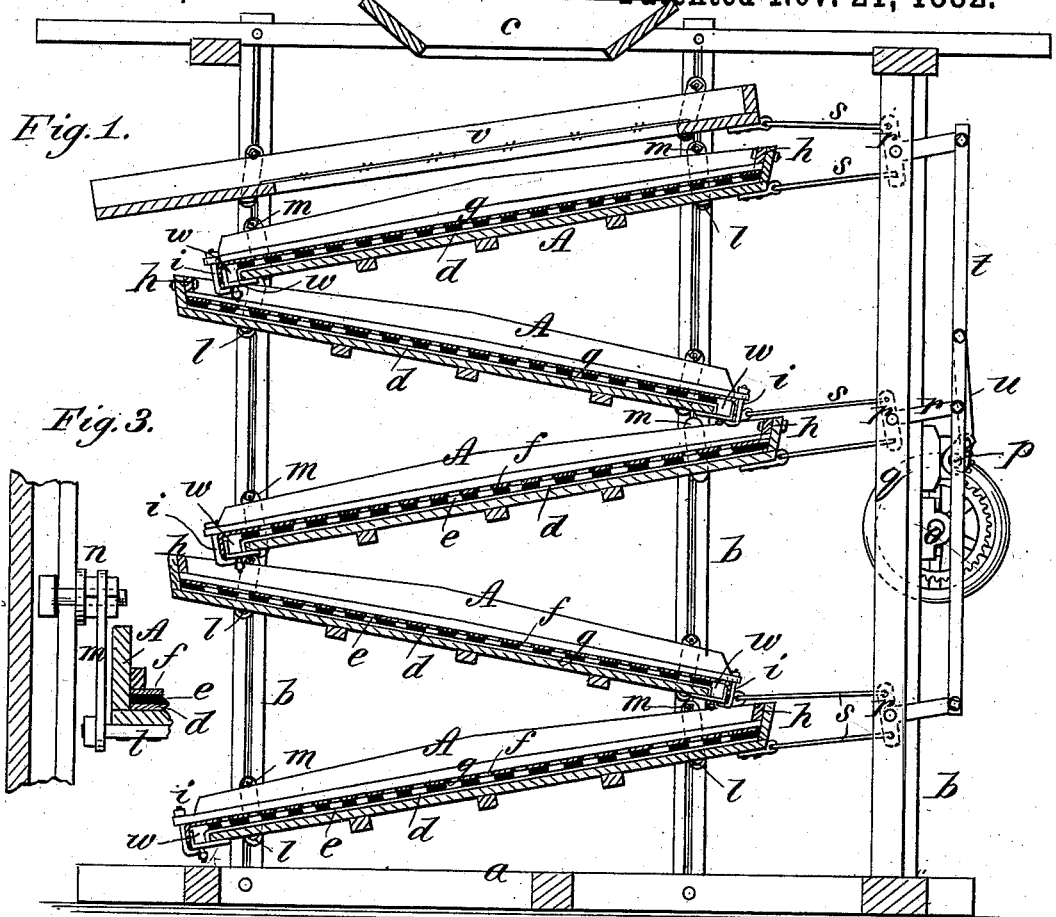
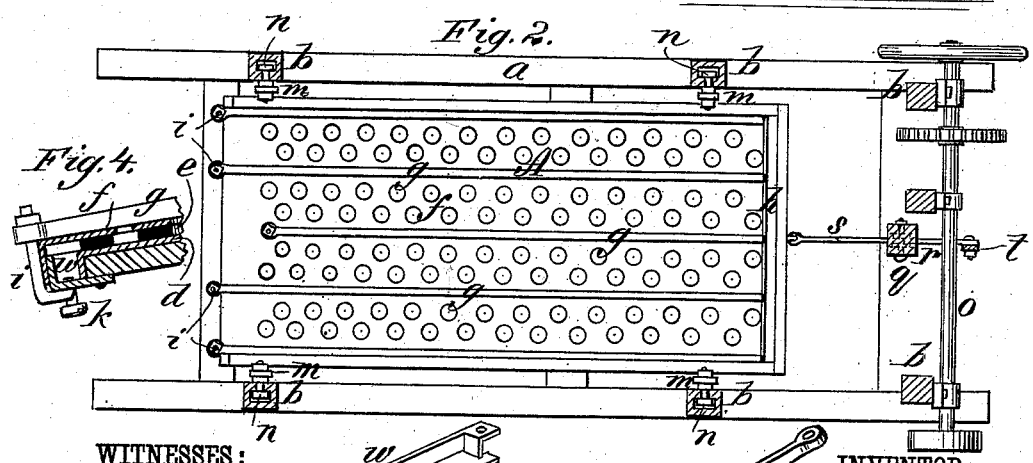
WITNESSES:
D. Twitchell
C. Sedgwick
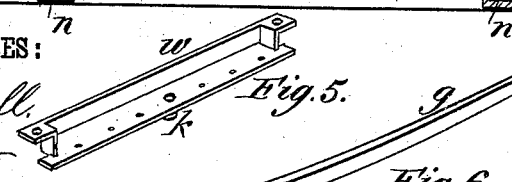
INVENTOR:
J. T. Long
BY 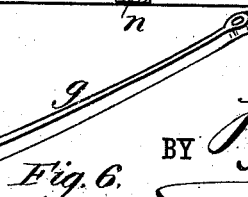
ATTORNEYS.

UNITED STATES PATENT OFFICE.

JOHN T. LONG, OF MONSEY, NEW YORK.

APPARATUS FOR SEPARATING GOLD AND SILVER FROM GRAVEL AND SAND.

SPECIFICATION forming part of Letters Patent No. 267,697, dated November 21, 1882.

Application filed January 9, 1882. (No model.)

*To all whom it may concern:*

Be it known that I, JOHN T. LONG, of Monsey, in the county of Rockland and State of New York, have invented a new and useful Improvement in Apparatus for Separating Gold and Silver from Gravel and Sand, of which the following is a full and exact description.

My invention relates to apparatus for separating gold and silver from sand and gravel, either dry or wet, and from crushed and pulverized rock; and it consists in a series of amalgamating-trays fitted for vibration and receiving the material in succession, all as hereinafter described and claimed.

Reference is to be had to the accompanying drawings, forming part of this specification, in which similar letters of reference indicate corresponding parts in all the figures.

Figure 1 is a vertical section of the apparatus. Fig. 2 is a horizontal section of the same. Fig. 3 is a detail section, showing the manner in which the trays are suspended. Fig. 4 is a detail cross-section, showing the trough for collecting the quicksilver. Fig. 5 is a perspective view of one trough detached, and Fig. 6 is a perspective view of one clamping-bar.

The frame consists of sills $a$ and vertical posts $b$, suitably framed together, and provided at the top with a hopper, $c$.

A are the trays, constructed as follows: The trays are formed of wood, with an attached strip on the sides and on one end for retaining the material. The bottom of each is covered with a plate, $d$, of copper or other metal, plated or covered with quicksilver or some coating to which quicksilver will adhere. The plate $d$ is covered with a perforated sheet, $e$, of rubber, felt, or other suitable material, the perforations being of any suitable shape and size, and placed at suitable distances apart. The perforated sheet $e$ is covered by a thin plate, $f$, of sheet-iron, which has perforations coinciding to those in the rubber or felt, but of slightly smaller size. These plates $d$ $e$ $f$ are held down by spring clamping-bars $g$, that are held at the upper or closed end of the trays by cross-strips $h$ and at their lower ends by locking-pins $i$, which extend through apertures in the bars, and have their ends bent beneath the trays, as shown most clearly in Fig. 4. The bars $g$ hold the plates tightly together, and the perforations form cells for receiving and retaining quicksilver. Across the open end of each tray is fixed a trough, $w$, (see Figs. 4 and 5,) the top of which is covered by an extension of plate $f$, so that the material may pass over, and the trough will receive the quicksilver when the plates are loosened. In the trough-bottom is tapped a screw, $k$, which being removed the quicksilver will escape. The trays A are attached at each end on cross-bars $l$, and the bars are suspended by links $m$, attached on bolts $n$, that are adjustable in slots in posts $b$, by simply unclamping an end nut, moving the bolt to the desired position, and then reclamping the nut, so that the inclination of the trays can be arranged as required. At one end of the frame is a cross-shaft, $o$, to which power is to be applied, and which is geared to a crank-shaft, $p$, above it. On a middle post, $q$, there are pivoted crank-levers $r$, that have their inner ends connected by links $s$ to the trays, and their outer ends are attached to a bar, $t$, from which a rod, $u$, passes to the crank of shaft $p$. With this mechanism the trays are simultaneously vibrated. Above the upper tray is a screen, $v$, vibrated by the same mechanism, and which serves to separate the coarser materials.

In operation the wet gravel and sand or dry pulverized rock drops from screen $v$ to the upper tray, over which it passes, and at the lower end falls upon the second tray, and so on to the last. The quicksilver is placed in the cells formed by the registering perforations of the plates $e$ $f$, so as to rest on the plate $d$, and will pass with the metal obtained from the ore into the troughs $w$, as soon as the plates are unclamped and the plates $e$ $f$ raised. In passing over the trays the fine particles of metal work to the bottom and into the quicksilver. In this manner nearly the whole of the precious metal is saved.

The perforated sheets for holding quicksilver may be applied to the hydraulic sluices used in ore-washers in placer-mining.

Having thus fully described my invention, I claim as new and desire to secure by Letters Patent—

1. The combination, with the tray, spring-bars $g$, and the cross-strips $h$, of the pins $i$, passing through said bars and tray, whereby the plates $d\ e\ f$ may be detachably clamped to the trays.

2. The bottom plate $d$, perforated plate $f$, and interposed perforated sheet $e$, combined with the trays A, substantially as shown and described.

3. The combination of the crank-levers $r$, links $s$, bar $t$, rod $u$, and crank-shaft $p$ with the suspended trays A, substantially as shown and described.

JOHN T. LONG.

Witnesses:
C. SEDGWICK,
J. H. SCARBOROUGH.